(12) United States Patent
Li et al.

(10) Patent No.: US 12,361,414 B2
(45) Date of Patent: Jul. 15, 2025

(54) PARSING EVENT DATA FOR CLUSTERING AND CLASSIFICATION

(71) Applicant: Plaid Inc., San Francisco, CA (US)

(72) Inventors: Vivian Li, San Jose, CA (US); Nikki Dahan, San Mateo, CA (US); Julie Shin, San Francisco, CA (US); Vikram Rao, San Francisco, CA (US); Akshit Annadi, San Francisco, CA (US); Christine Zhou, Seattle, WA (US); Zeng Wang, Palo Alto, CA (US); Stella Kim, San Francisco, CA (US); Chris Jin, Atlanta, GA (US); Darius Simmons, Atlanta, GA (US)

(73) Assignee: Plaid Inc., San Francisco, CA (US)

( * ) Notice: Subject to any disclaimer, the term of this patent is extended or adjusted under 35 U.S.C. 154(b) by 451 days.

(21) Appl. No.: 17/821,682

(22) Filed: Aug. 23, 2022

(65) Prior Publication Data

US 2024/0070658 A1   Feb. 29, 2024

(51) Int. Cl.
*G06Q 20/38* (2012.01)
*G06F 18/23* (2023.01)
(Continued)

(52) U.S. Cl.
CPC ........... *G06Q 20/389* (2013.01); *G06F 18/23* (2023.01); *G06F 21/6254* (2013.01);
(Continued)

(58) Field of Classification Search
None
See application file for complete search history.

(56) References Cited

U.S. PATENT DOCUMENTS

| 5,668,978 | A | * | 9/1997 | Yasutake | G06F 8/10 |
| | | | | | 703/26 |
| 7,720,826 | B2 | * | 5/2010 | Fitzer | G06F 16/2455 |
| | | | | | 707/754 |

(Continued)

FOREIGN PATENT DOCUMENTS

| CA | 3007723 | C | * | 12/2016 | ............. G06F 16/35 |
| CN | 1256700 | C | * | 5/2006 | ............. G06F 18/24 |

(Continued)

OTHER PUBLICATIONS

M.S.B. PhridviRaj, Chintakindi Srinivas, and Dr.C.V.GuruRao (Clustering Text Data Streams—A tree Based Approach with Ternary Function and Ternary Feature Vector); pp. 9; Published in (Year: 2014).*

*Primary Examiner* — Ali H. Cheema
(74) *Attorney, Agent, or Firm* — Harrity & Harrity, LLP

(57) ABSTRACT

In some implementations, a classification system may receive credentials associated with a data source and may receive, from the data source and using the credentials, a set of structured data including input events and output events. The classification system may filter the set of structured data by applying a first set of rules to generate a filtered set of structured data and may convert the filtered set of structured data to one or more numerical vectors, where a vector space associated with the one or more numerical vectors is infinite-dimensional. The classification system may further cluster the one or more numerical vectors using a first machine learning model to generate one or more clusters. Accordingly, the classification system may determine one or more classifications based on the set of structured data, each of the one or more classifications being associated with a corresponding frequency and a corresponding category.

20 Claims, 16 Drawing Sheets

(51) Int. Cl.
    *G06F 21/62*     (2013.01)
    *G06N 20/20*     (2019.01)
    *G06Q 20/42*     (2012.01)
    *G06Q 40/12*     (2023.01)
    *G06F 18/24*     (2023.01)
    *G06N 7/01*     (2023.01)
    *G06N 20/00*     (2019.01)
    *G06Q 40/06*     (2012.01)

(52) U.S. Cl.
    CPC ............ *G06N 20/20* (2019.01); *G06Q 20/42* (2013.01); *G06Q 40/125* (2013.12); *G06F 18/24* (2023.01); *G06N 7/01* (2023.01); *G06N 20/00* (2019.01); *G06Q 40/06* (2013.01); *G06Q 40/12* (2013.12)

(56) References Cited

U.S. PATENT DOCUMENTS

| | | | | |
|---|---|---|---|---|
| 10,878,497 | B2* | 12/2020 | Painter | G06F 16/23 |
| 11,227,333 | B2* | 1/2022 | Rosenblatt | G06Q 40/03 |
| 11,843,622 | B1* | 12/2023 | Tellez | H04L 63/1425 |
| 2014/0324645 | A1* | 10/2014 | Stiffler | G06Q 40/12 705/30 |
| 2015/0212976 | A1* | 7/2015 | Chattopadhayay | G06F 16/35 704/9 |
| 2019/0095478 | A1* | 3/2019 | Tankersley | G06F 11/3006 |
| 2019/0236149 | A1* | 8/2019 | Kuruvada | G06F 16/2255 |
| 2020/0090052 | A1* | 3/2020 | Nelson | G06F 16/285 |
| 2020/0278953 | A1* | 9/2020 | Yang | G06F 16/245 |
| 2021/0117868 | A1* | 4/2021 | Sriharsha | G06N 20/20 |
| 2021/0263900 | A1* | 8/2021 | Joyce | G06N 20/00 |
| 2021/0406739 | A1* | 12/2021 | O'Connor | G06N 3/08 |
| 2023/0137987 | A1* | 5/2023 | Anderton-Yang | G06V 10/454 382/103 |

FOREIGN PATENT DOCUMENTS

| | | | | |
|---|---|---|---|---|
| CN | 109190946 | A * | 1/2019 | |
| CN | 109564568 | A * | 4/2019 | ............ G06F 16/21 |
| KR | 20200083053 | A * | 7/2020 | ............ G06F 16/367 |
| KR | 20220164985 | A * | 12/2022 | ............ G06F 16/22 |

\* cited by examiner

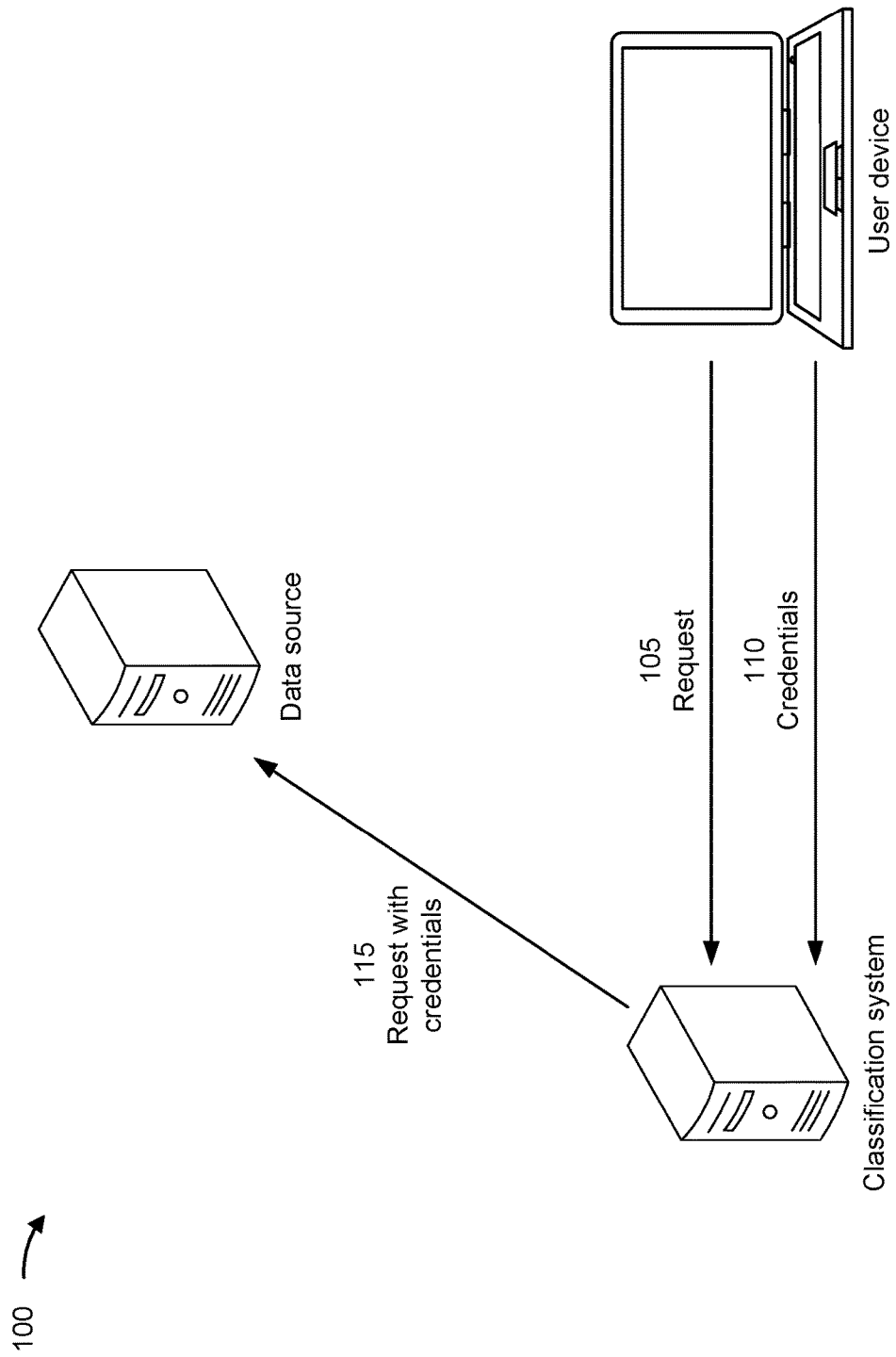

PARSING EVENT DATA FOR CLUSTERING AND CLASSIFICATION

BACKGROUND

Structured data, such as event data and/or transactional data, may include both input events and output events. Both input and output events may be one-time events or may instead form part of a logical group of recurring events.

SUMMARY

Some implementations described herein relate to a system for parsing event data for clustering and classification. The system may include one or more memories and one or more processors communicatively coupled to the one or more memories. The one or more processors may be configured to receive, from a data source, a set of structured data comprising one or more input events and one or more output events. The one or more processors may be configured to filter the set of structured data by applying a first set of rules to generate a filtered set of structured data, wherein the filtered set of structured data excludes the one or more output events and excludes at least one type of input event. The one or more processors may be configured to convert the filtered set of structured data to a plurality of numerical vectors, wherein a vector space associated with the plurality of numerical vectors is infinite-dimensional. The one or more processors may be configured to cluster the plurality of numerical vectors using a first machine learning model to generate a plurality of clusters. The one or more processors may be configured to determine a plurality of classifications based on the set of structured data by applying a second set of rules to the plurality of clusters, wherein each of the plurality of classifications is associated with a corresponding frequency and a corresponding category. The one or more processors may be configured to rank the plurality of classifications using a second machine learning model. The one or more processors may be configured to output the plurality of classifications, as ranked, to a user device.

Some implementations described herein relate to a method of parsing event data for clustering and classification. The method may include receiving, from a user device, one or more credentials associated with a data source. The method may include receiving, from the data source, a set of structured data comprising one or more input events and one or more output events. The method may include filtering the set of structured data by applying a first set of rules to generate a filtered set of structured data, wherein the filtered set of structured data excludes the one or more output events and excludes at least one type of input event. The method may include converting the filtered set of structured data to one or more numerical vectors, wherein a vector space associated with the one or more numerical vectors is infinite-dimensional. The method may include clustering the one or more numerical vectors using a first machine learning model to generate one or more clusters. The method may include determining one or more classifications based on the set of structured data, wherein each of the one or more classifications is associated with a corresponding frequency and a corresponding category. The method may include outputting the one or more classifications to the user device.

Some implementations described herein relate to a non-transitory computer-readable medium that stores a set of instructions for parsing transactional data for clustering and classification for a device. The set of instructions, when executed by one or more processors of the device, may cause the device to receive, from a first data source, a first set of transactional data comprising one or more first input transactions and one or more first output transactions. The set of instructions, when executed by one or more processors of the device, may cause the device to filter the first set of transactional data by applying a first set of rules to generate a first filtered set of transactional data, wherein the first filtered set of transactional data excludes the one or more first output transactions and excludes at least one type of input transaction. The set of instructions, when executed by one or more processors of the device, may cause the device to convert the first filtered set of transactional data to one or more first numerical vectors, wherein a vector space associated with the one or more first numerical vectors is infinite-dimensional. The set of instructions, when executed by one or more processors of the device, may cause the device to cluster the one or more first numerical vectors using a machine learning model to generate one or more first clusters. The set of instructions, when executed by one or more processors of the device, may cause the device to determine one or more first transaction classifications based on the first set of structured data by applying a second set of rules to the one or more first clusters, where each of the one or more first transaction classifications is associated with a corresponding transaction frequency and a corresponding transaction category. The set of instructions, when executed by one or more processors of the device, may cause the device to output the one or more first transaction classifications to a user device.

BRIEF DESCRIPTION OF THE DRAWINGS

FIGS. 1A-1H are diagrams of an example implementation associated with parsing event data for clustering and classification, in accordance with some embodiments of the present disclosure.

DETAILED DESCRIPTION

Figure 1B:
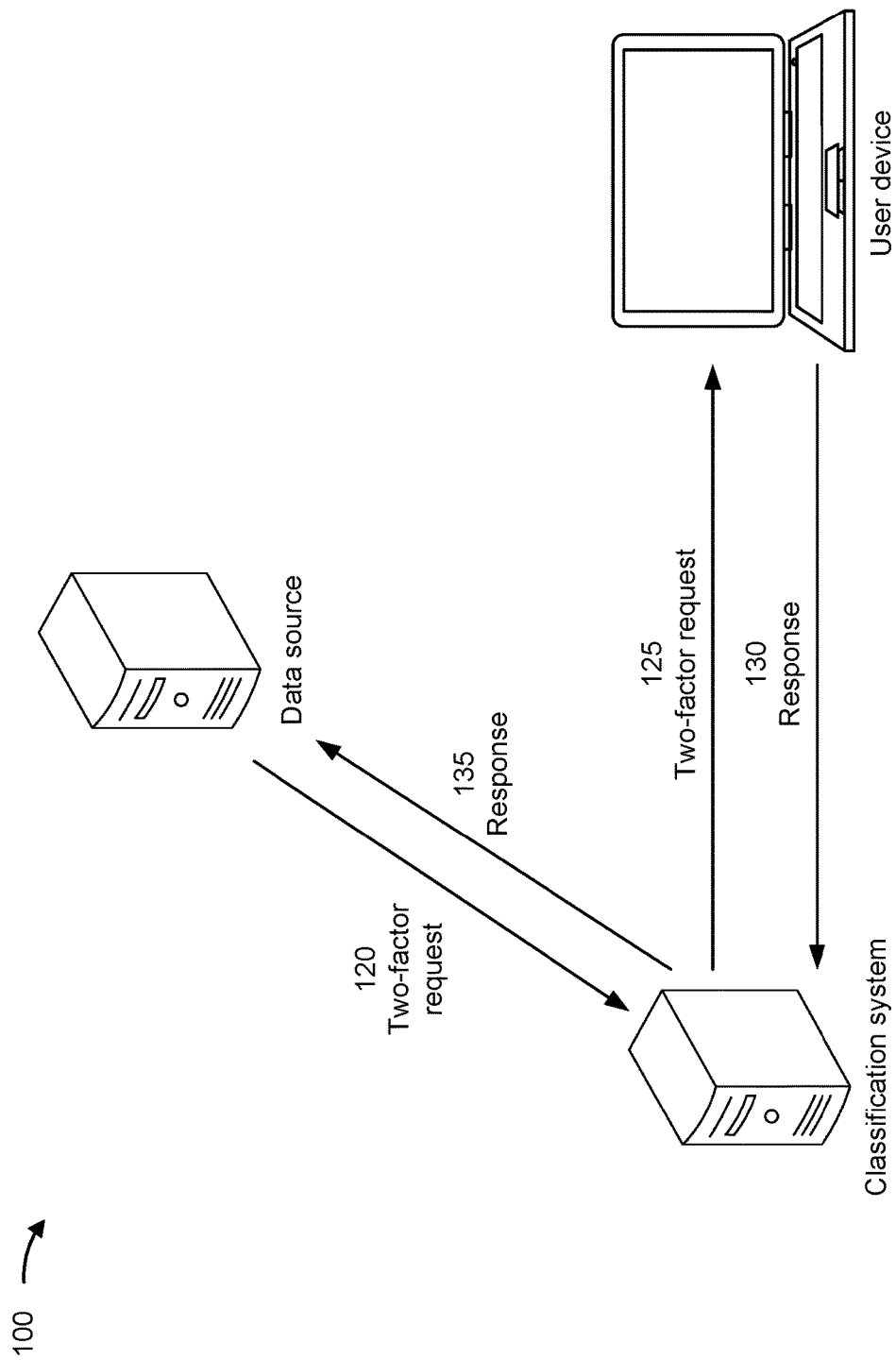

The following detailed description of example implementations refers to the accompanying drawings. The same reference numbers in different drawings may identify the same or similar elements.

Structured data, such as event data and/or transactional data, often includes string entries describing each entry (e.g., each event or each transaction). Additionally, the structured data may include both input events and output events. Both input and output events may be one-time events or may instead form part of a logical group of recurring events. One computerized technique for classifying entries into input event groups (or output event groups) is to apply a supervised machine learning model with a defined vector space. However, such models are prone to error and are computationally costly. As a result, power and processing resources are often wasted in deploying these machine learning models.

Some implementations described herein apply an unsupervised clustering model with an infinite-dimensional vector space to sort entries of structured data into input event groups. Using an infinite-dimensional vector increases accuracy of the clustering model while using unsupervised results in the clustering model consumes less power and processing resources than supervised machine learning models. Additionally, some implementations described herein apply rules to label the input event groups. By using rules rather than building the labeling into a classification model (e.g., a supervised machine learning model as described above), additional power and processing resources are conserved.

Some implementations described herein additionally use a machine learning model to rank input event classifications (e.g., the labeled input event groups). Ranking the classifications improves user experience by moving most relevant classifications toward a top of a graphical user interface (GUI). Moreover, power and processing resources are conserved by reducing time that the user spends on the GUI (e.g., in order to confirm the classifications).

FIGS. 1A-1H are diagrams of an example 100 associated with parsing event data for clustering and classification. As shown in FIGS. 1A-1H, example 100 includes a data source, a user device, and/or a third-party device. These devices are described in more detail in connection with FIGS. 5 and 6.

As shown in FIG. 1A and by reference number 105, the user device may transmit, and a classification system may receive, a request to parse, cluster, and classify structured data associated with a user of the user device. For example, the request may include a hypertext transfer protocol (HTTP) request. Additionally, or alternatively, the request may include a call to an application programming interface (API) provisioned by the classification system.

Although shown as sent from the user device to the classification system, the request may alternatively be transmitted via the third-party device. For example, the user device may transmit the request to the third-party device such that the third-party device relays the request (or generates a new request based on the request from the user device) to the classification system.

As shown by reference number 110, the user device may transmit, and the classification system may receive, credentials (e.g., one or more credentials) associated with the data source. For example, the credentials may include a username and password, an email address and passcode, an access token, and/or another type of information associated with authenticating the user at the data source. In some implementations, the credentials may be transmitted with the request. Alternatively, the classification system may prompt the user device based on the request and receive the credentials from the user device in response to the prompt.

Accordingly, as shown by reference number 115, the classification system may transmit, and the data source may receive, a request for structured data associated with the user. For example, the request may include an HTTP request. Additionally, or alternatively, the request may include a call to an API provisioned by the data source.

In some implementations, as shown in FIG. 1A, the classification system may include the credentials with the request. Alternatively, the classification system may prompt the user device based on the request and receive the credentials from the user device in response to the prompt.

As shown in FIG. 1B and by reference number 120, the data source may be configured for two-factor authorization such that the data source transmits, and the classification system receives, a request for two-factor authorization. For example, the data source may request selection of an email address, a phone number, and/or another type of communication channel to receive a two-factor authorization code. In another example, the data source may transmit a challenge question.

As shown by reference number 125, the classification system may forward the request for two-factor authorization to the user device. For example, the classification system may relay the request for two-factor authorization to the user device. Alternatively, the classification system may generate a new request to transmit to the user device based on the request for two-factor authorization.

As shown by reference number 130, the user device may transmit, and the classification system may receive, a response to the request for two-factor authorization. Accordingly, as shown by reference number 135, the classification system may forward the response to the data source. For example, the classification system may relay the response to the data source. Alternatively, the classification system may generate a new response to transmit to the data source based on the response from the user device.

Figure 1C:
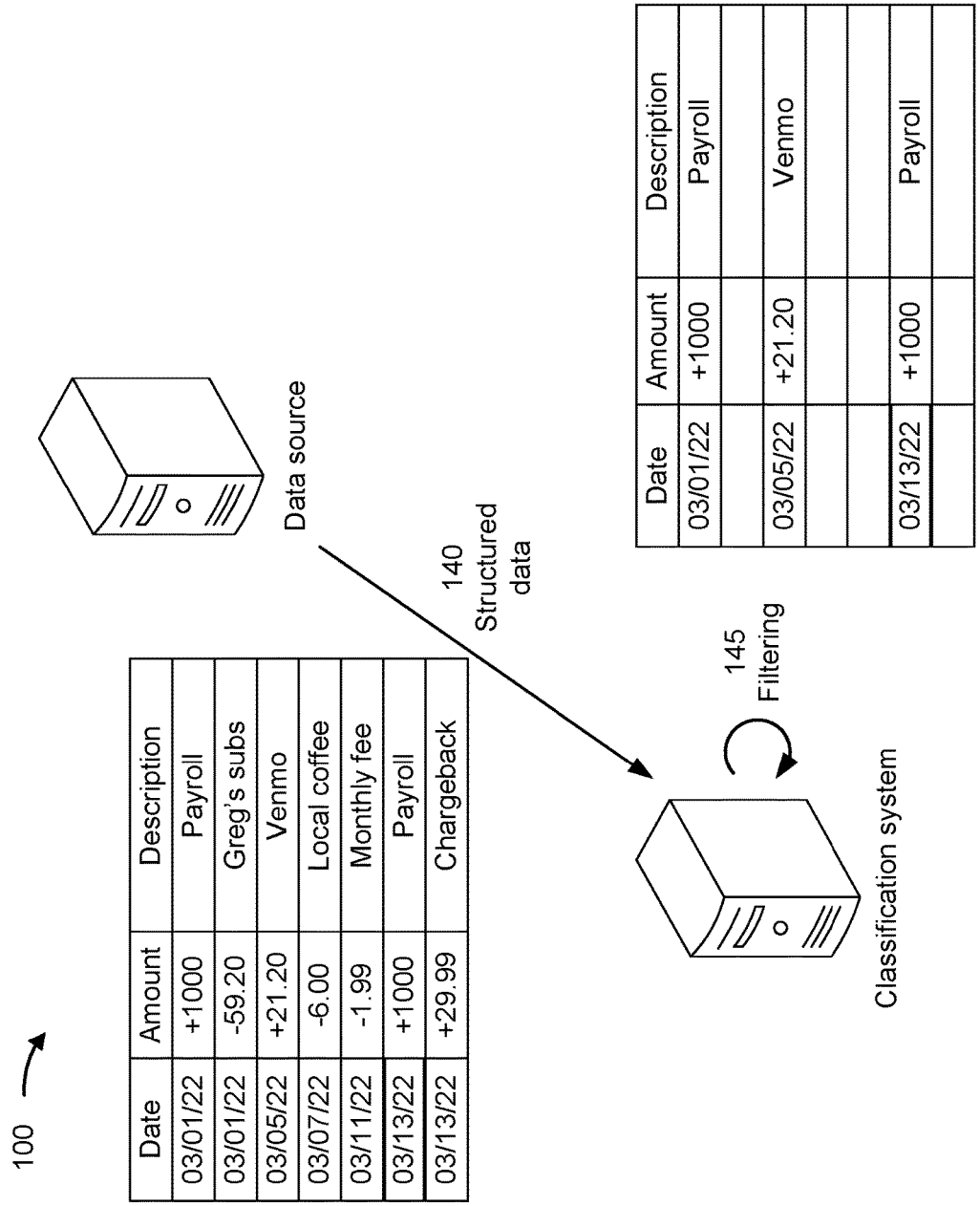

Therefore, as shown in FIG. 1C and by reference number 140, the classification system may receive, from the data source, the structured data associated with the user of the user device. As shown in FIG. 1C, the structured data may include a table or another type of relational data structure. Alternatively, the structured data may include a graph or another type of abstract data structure. The structured data may include events (e.g., labeled by date in example 100 but additionally or alternatively labeled by time). Each event may be associated with a string description. Additionally, each event may be associated with an amount. Accordingly, each event may be an input event or an output event (e.g., based on whether the associated amount is represented by a positive integer or a negative integer). In some implementations, the structured data may comprise transactional data (e.g., such that input events are input transactions and output events are output transactions).

Although shown as using at least one request and response, the classification system may instead perform a scraping operation to obtain the structured data from the data source. For example, the classification system may use the credentials to navigate to a webpage (e.g., using a domain name system (DNS) to map a uniform resource locator (URL) associated with the data source to an Internet protocol (IP) address associated with the data source) and scrape the structured data from the webpage (e.g., after logging in using the credentials).

As shown by reference number 145, the classification system may filter the structured data by applying a first set of rules. Accordingly, the classification system generates a filtered set of structured data, as shown in FIG. 1C. For example, the filtered set of structured data may exclude output events and exclude a type of input event (e.g., at least one type of input event). For example, the types of input events may include refunds, chargebacks, adjustments, and deposits, and the filtered set of structured data may exclude refunds, chargebacks, and/or adjustments. Accordingly, the first set of rules may include, for example, regular expressions (regexes), such as mathematical rules and/or string match rules. For example, to exclude output events, the first set of rules may remove events with associated amounts that are represented by negative integers. Additionally, or alternatively, to exclude types of input events, the first set of rules may remove events that include selected words or phrases in associated string descriptions. For example, the classification system may convert the string descriptions to a same case (e.g., all uppercase letters or all lowercase letters) and then remove events that include "refund," "chargeback," "error," "adjustment," and/or another similar word or phrase. By using the first set of rules to perform filtering, the classification system conserves power and processing resources because the filtered set of structured data can be classified with less power and processing resources as compared with the original structured data.

Figure 1D:
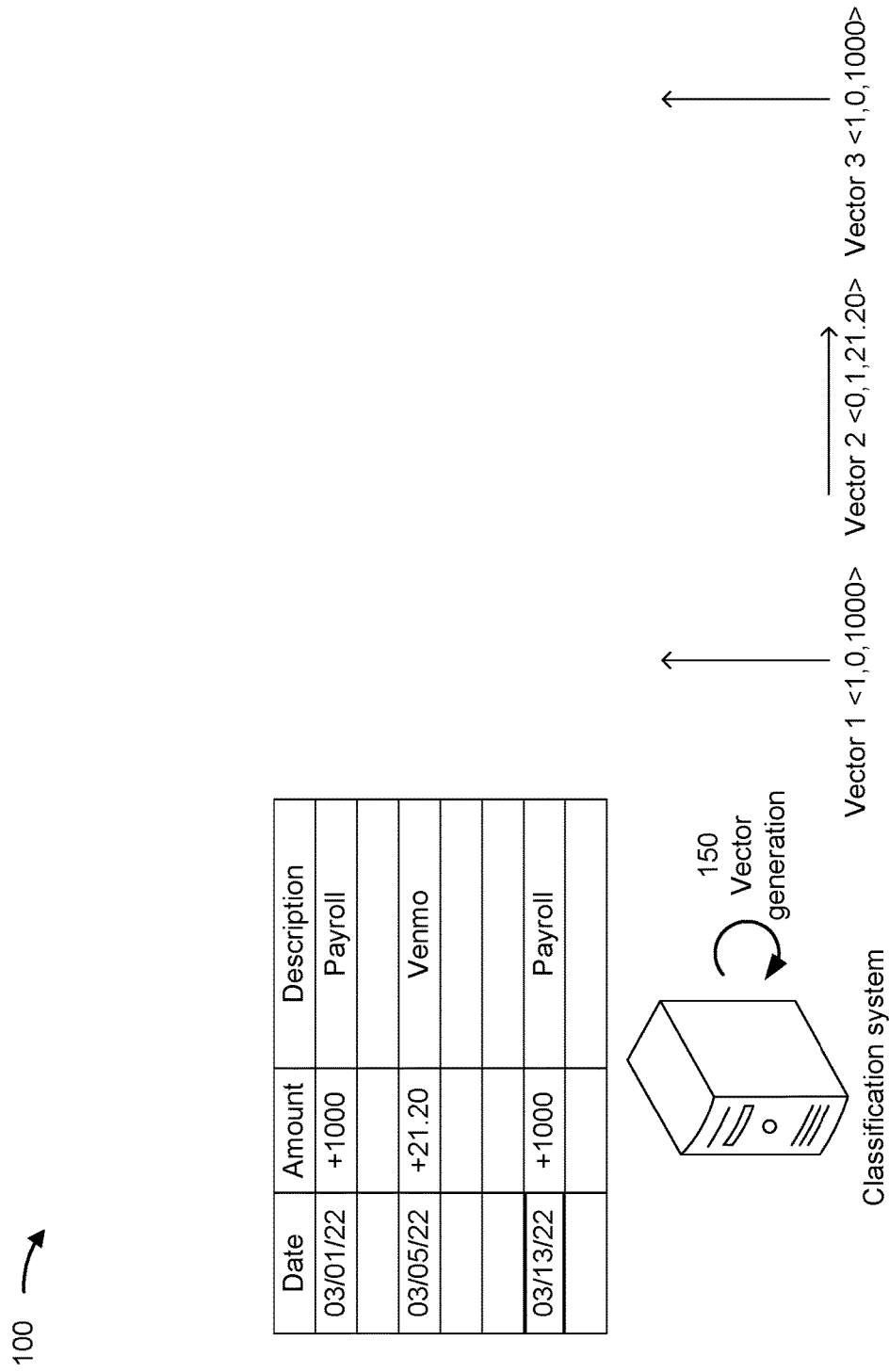

As shown in FIG. 1D and by reference number 150, the classification system may convert the filtered set of structured data to numerical vectors (e.g., a plurality of numerical vectors). The vector space associated with the numerical vectors may be infinite-dimensional. For example, the classification system may generate a new dimension for each word included in a string description of at least one event in the filtered set of structured data. Accordingly, each numerical vector may include coordinates that are set to '1' (e.g., when a word corresponding to a dimension is present in the string description for the event represented by the vector) or '0' (e.g., when the word corresponding to the dimension is absent from the string description for the event represented by the vector). By using an infinite-dimensional vector space rather than a finite (e.g., preconfigured) vector space, the classification system may cluster the numerical vectors (e.g., as described below and in connection with FIG. 3) more accurately. Additionally, in some implementations, at least one coordinate of each numerical vector may be set to a magnitude of the amount associated with the event represented by the vector.

Figure 1E:
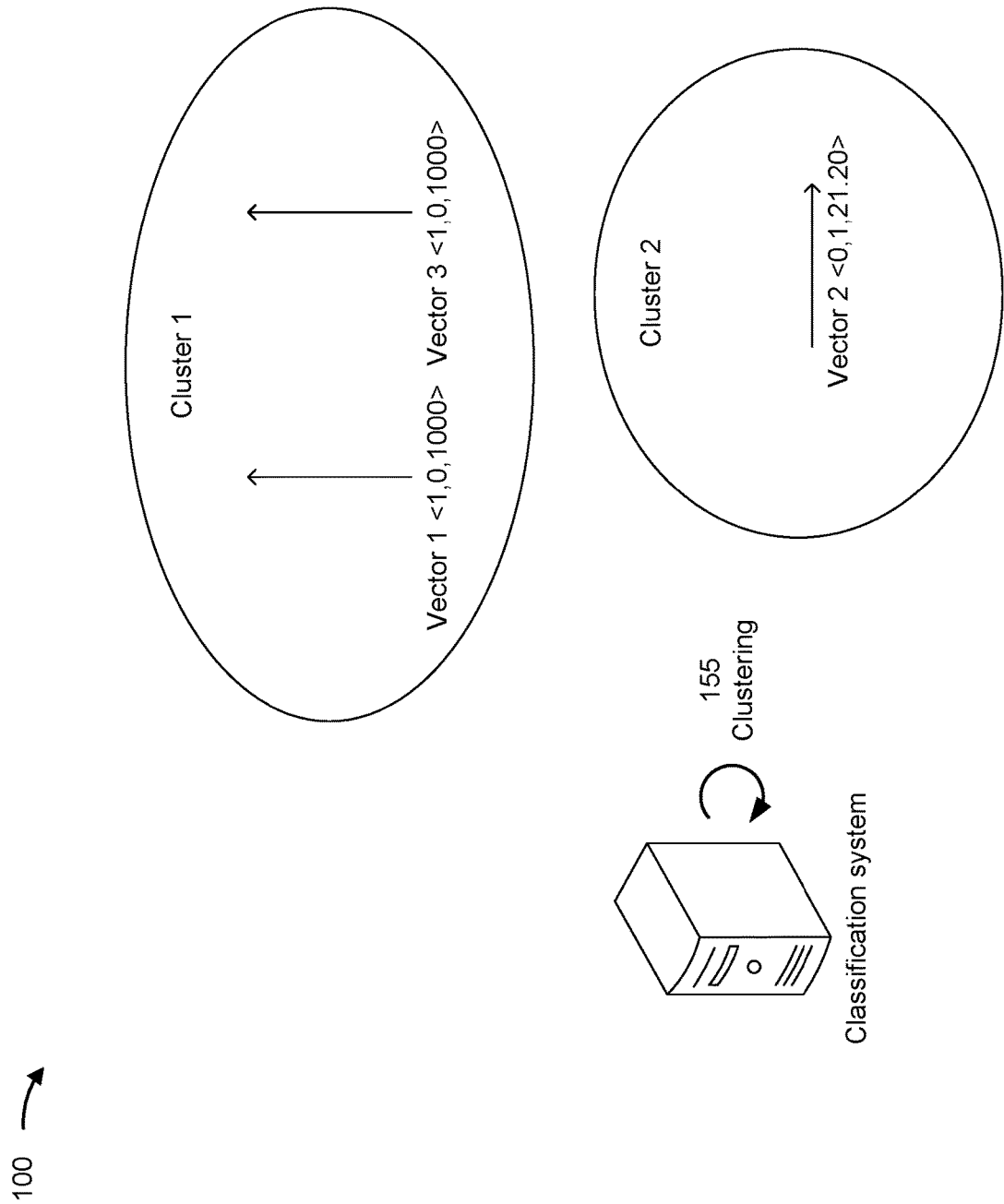

As shown in FIG. 1E and by reference number 155, the classification system may cluster the numerical vectors using a first machine learning model. Accordingly, the classification system generates clusters (e.g., a plurality of clusters). For example, the classification system may use an unsupervised machine learning model as described in connection with FIG. 3. By using an unsupervised machine learning model, the classification system clusters the numerical vectors with less power and processing resources than would be consumed by a supervised machine learning model.

Figure 1F:
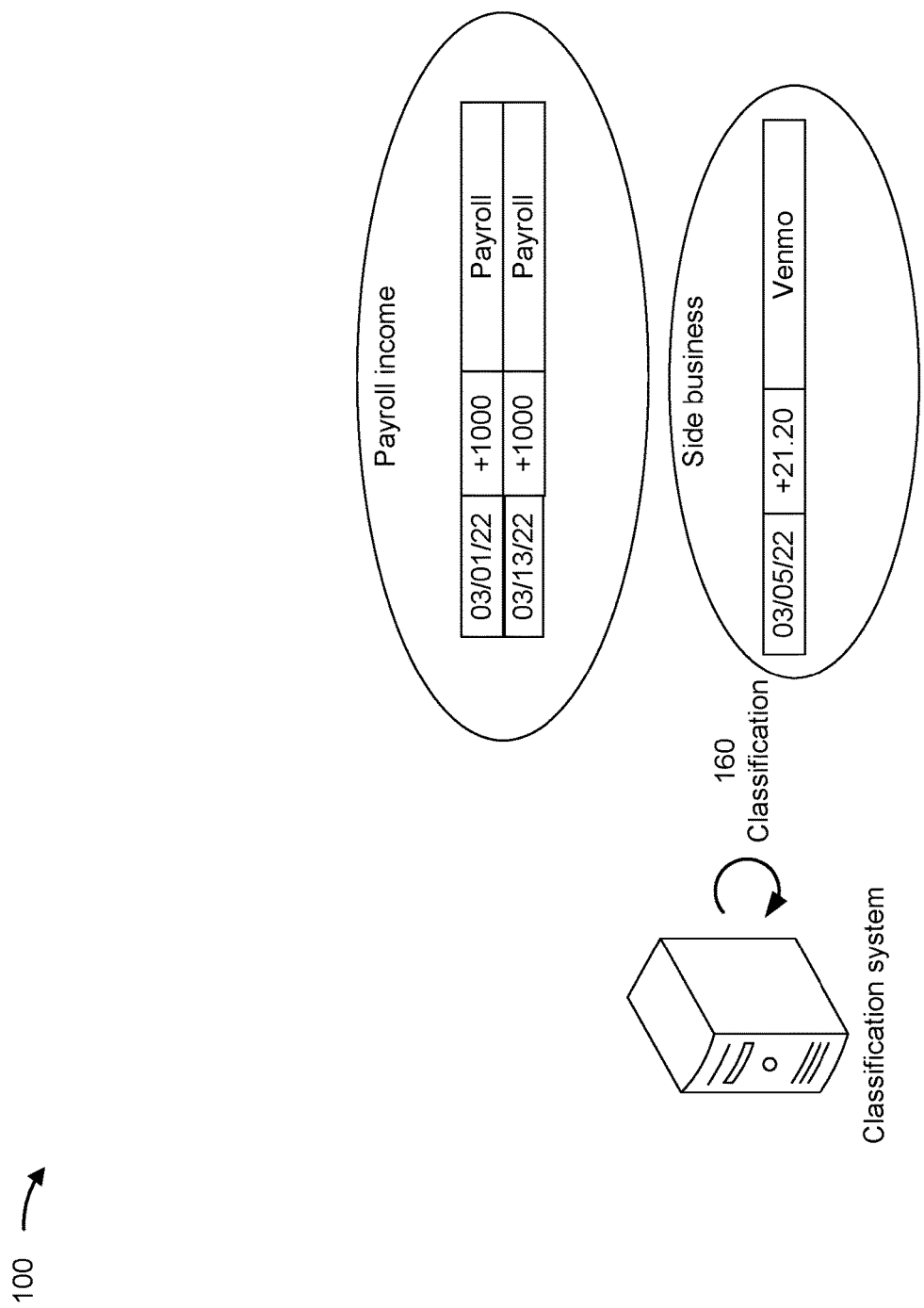

Furthermore, as shown in FIG. 1F and by reference number 160, the classification system may determine classifications (e.g., a plurality of classifications), based on the structured data, by applying a second set of rules to the clusters. In other words, the classification system may label the clusters. In one example, the second set of rules may include mathematical rules that label a cluster based on an average, a median, a standard deviation, a mode, and/or another statistical measure of amounts associated with events in the cluster. For example, the second set of rules may apply a label of "salary" or "payroll income" when the standard deviation satisfies a variance threshold but apply a label of "contractor income" or "side business" when the standard deviation fails to satisfy the variance threshold.

Additionally, or alternatively, the second set of rules may include string match rules that label a cluster based on string descriptions associated with events in the cluster. For example, the second set of rules may apply a label of "salary" or "payroll income" when the string descriptions include words or phrases like "payroll," "direct deposit," "paycheck," "salary," and so on but apply a label of "contractor income" or "side business" when the string descriptions include words or phrases like "Venmo," "Stripe," "Square," "Paypal," "Quickbooks," and so on. Additionally, or alternatively, the second set of rules may include frequency rules that label a cluster based on an estimated frequency associated with events in the cluster. For example, the second set of rules may apply a label of "salary" or "payroll income" when the events occur approximately (e.g., within a margin of error, such as a few days) monthly, semi-monthly, biweekly, and so on but apply a label of "contractor income" or "side business" when the events occur irregularly (e.g., outside the margin of error). By using the second set of rules to perform labeling, the classification system conserves power and processing resources because the second set of rules are fast and do not consume significant power and processing resources.

Each classification may be associated with a corresponding frequency and a corresponding category. For example, the "payroll income" classification in example 100 is associated with a salary category and a frequency of semi-monthly. Similarly, the "side business" classification in example 100 is associated with a gig economy category and an irregular frequency. In some implementations, there may be additional categories (e.g., winnings or hobby, among other examples). Additionally, or alternatively, there may be additional frequencies (e.g., monthly or biweekly, among other examples).

Alternatively, the classification system may determine classifications (e.g., a plurality of classifications), based on the structured data, by applying a machine learning model trained using anonymized data associated with other users. For example, the machine learning model may recognize mathematical, string, and/or frequency patterns within the anonymized data in order to label clusters as "side business" more accurately.

Although example 100 is shown using two clusters (and two labels), other examples may include additional clusters (and/or additional labels). For example, there may be additional clusters labeled as "payroll income" or additional clusters labeled as "side business." Additionally, or alternatively, there may be additional labels, such as "gambling winnings" or "pension income."

Figure 1G:
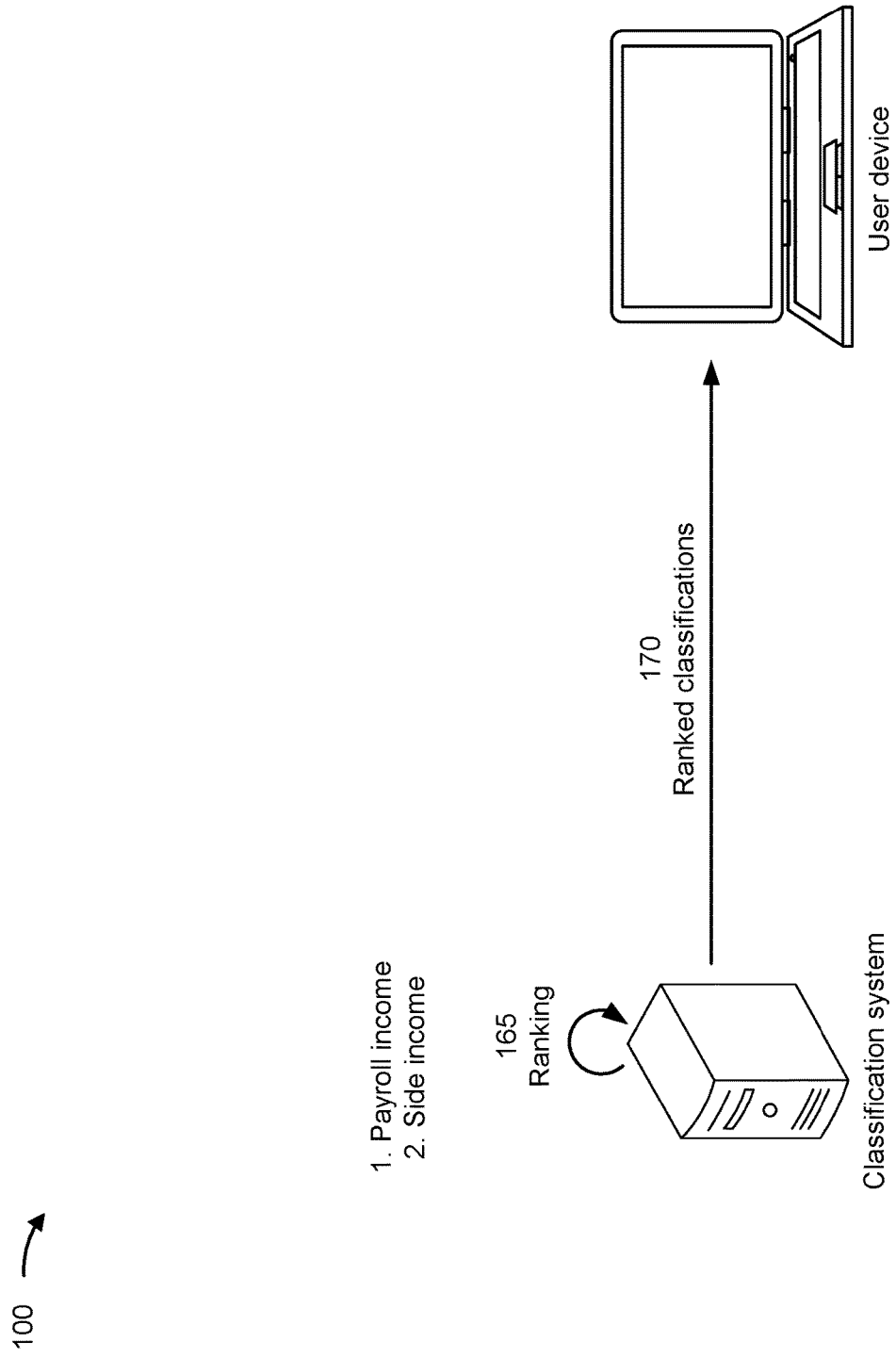

As shown in FIG. 1G and by reference number 165, the classification system may rank the classifications using a second machine learning model. Accordingly, the classification system generates a ranked set of classifications (e.g., a ranked set of labeled clusters). For example, the classification system may use a supervised machine learning model as described in connection with FIGS. 4A-4B. By using a supervised machine learning model, the classification system ranks the classifications more accurately and improves a user experience in confirming the classifications (e.g., as described below). Moreover, accurately ranked classifications reduce a time taken by the user to confirm the classifications, which conserves power and processing resources at the user device.

Figure 2A:
FIGS. 2A-2B are diagrams of example graphical user interfaces associated with parsing event data for clustering and classification, in accordance with some embodiments of the present disclosure.

Accordingly, as shown by reference number 170, the classification system may output the classifications, as ranked, to the user device. For example, the classification system may output a GUI (e.g., as shown in FIG. 2A), in which each classification is indicated adjacent to a corresponding input element (e.g., a checkbox, a radio button, a text box, and/or another type of input element).

Alternatively, the classification system may output the classifications in descending order, for example, according to quantities associated with the classifications (e.g., a quantity of events included in each classification or a total sum of amounts associated with the events included in each classification, among other examples). Using the descending order conserves power and processing resources at the classification system.

Figure 1H:
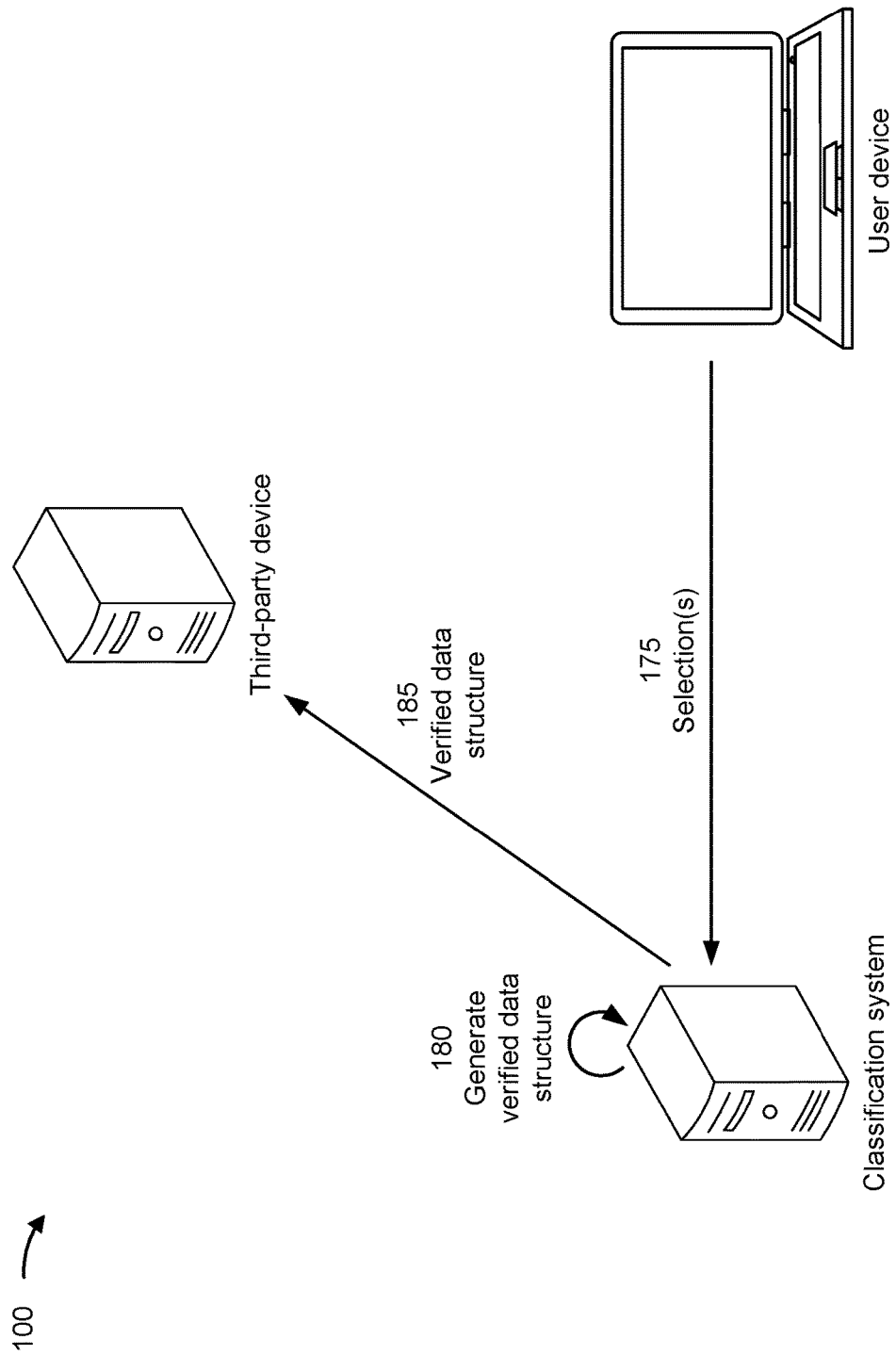

As shown in FIG. 1H and by reference number 175, the user device may transmit, and the classification system may receive, a confirmation of at least one of the classifications. For example, the user may interact with the corresponding input elements of the GUI (e.g., as described in connection with FIG. 2A) such that the confirmation is based on interaction with the corresponding input elements.

Figure 2B:
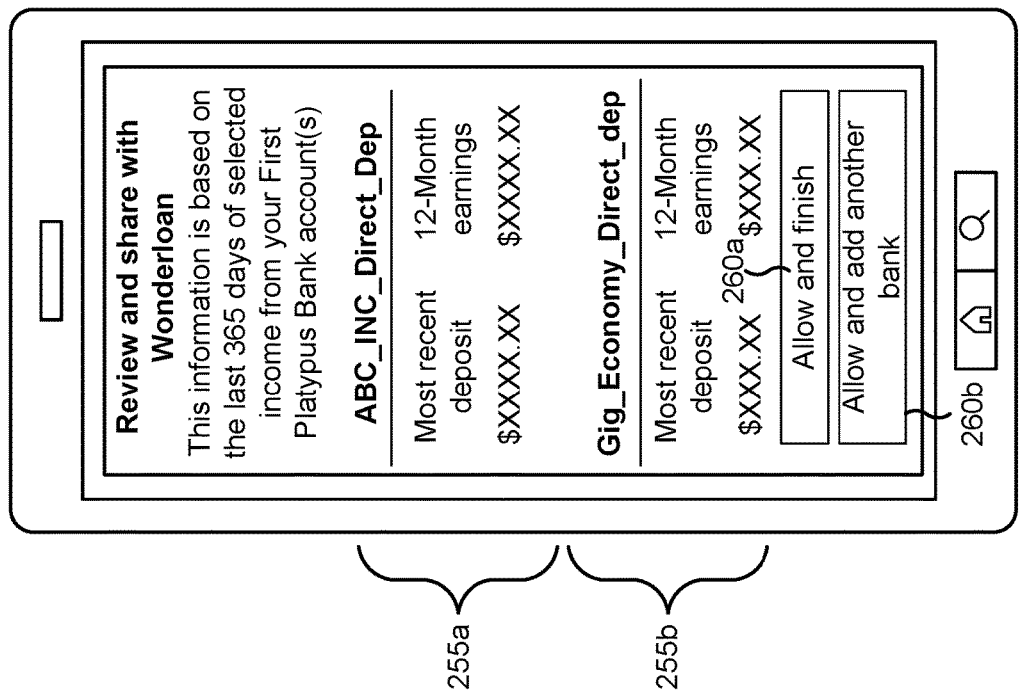

In some implementations, the classification system may output, in response to the confirmation, a GUI (e.g., as shown in FIG. 2B) indicating a total amount (e.g., at least one total amount) associated with the confirmed classification. Accordingly, the user may have an opportunity to correct the previous confirmation. Therefore, the user device may transmit, and the classification system may receive, an additional confirmation based on the total amount.

Additionally, in some implementations, the GUI indicating the total amount may allow the user to repeat the process described in connection with FIGS. 1A-1G for an additional data source. Accordingly, the classification system may iteratively filter, cluster, and classify structured data sets associated with the user from multiple data sources. Once all structured data sets have been classified, the user device may transmit, and the classification system may receive, a final confirmation using the GUI indicating the total amount shown after confirmation of the classifications (e.g., at least one classification) associated with the final data source.

As shown by reference number 180, the classification system may generate a finalized data structure based on the confirmed classification. For example, the finalized data structure may comprise a table, or another type of relational data structure, encoding only events associated with confirmed classifications (e.g., included in labeled clusters that were confirmed by the user device). Alternatively, the finalized data structure may comprise a graph, or another type of abstract data structure, encoding only events associated with confirmed classifications (e.g., included in labeled clusters that were confirmed by the user device).

In some implementations, as shown by reference number 185, the classification system may transmit, and the third-party device may receive, the finalized data structure. Accordingly, the third-party device may use the finalized data structure to perform an action (e.g., approving an account for the user or updating a property associated with an account for the user, among other examples).

As indicated above, FIGS. 1A-1H are provided as an example. Other examples may differ from what is described with regard to FIGS. 1A-1H.

FIGS. 2A and 2B are diagrams of example GUIs 200 and 250, respectively, associated with parsing event data for clustering and classification. As shown in FIG. 2A, example GUI 200 includes a first section 205a associated with higher-ranked classifications. In example GUI 200, the first section 205a includes a highest ranked classification ("ABC_INC_Direct_Dep") adjacent to a corresponding checkbox (a corresponding input component) and a second-highest ranked classification ("Gig_Economy_Direct_dep") adjacent to a corresponding checkbox (a corresponding input component).

Similarly, example GUI 200 includes a second section 205b associated with lower-ranked classifications. In example GUI 200, the second section 205b includes a second-lowest ranked classification ("Wings for Plaid LLC") adjacent to a corresponding checkbox (a corresponding input component) and a lowest ranked classification ("Platypus") adjacent to a corresponding checkbox (a corresponding input component). Therefore, a user may interact with the corresponding checkboxes and button 210 in order to confirm (and/or reject) the classifications shown in example GUI 200.

As shown in FIG. 2B, example GUI 250 includes a first section 255a associated with a highest-ranked confirmed (e.g., using example GUI 200) classification. In example GUI 250, the first section 255a indicates the confirmed classification ("ABC_INC_Direct_Dep") adjacent to a total amount associated with the confirmed classification (under "12-Month earnings"). In some implementations, the confirmed classification may additionally be shown adjacent to a most recent amount associated with the confirmed classification (under "Most recent deposit").

Similarly, example GUI 250 includes a second section 255b associated with a second-highest-ranked confirmed (e.g., using example GUI 200) classification. In example GUI 250, the second section 255b indicates the confirmed classification ("Gig_Economy_Direct_dep") adjacent to a total amount associated with the confirmed classification (under "12-Month earnings"). In some implementations, the confirmed classification may additionally be shown adjacent to a most recent amount associated with the confirmed classification (under "Most recent deposit"). Therefore, a user may interact with button 260a in order to additionally confirm the confirmed classifications shown in example GUI 250. Alternatively, the user may interact with button 260b in order to iteratively obtain classifications based on structured data from other data sources (e.g., as described in connection with FIG. 1H).

As indicated above, FIGS. 2A-2B are provided as examples. Other examples may differ from what is described with regard to FIGS. 2A-2B.

Figure 3:
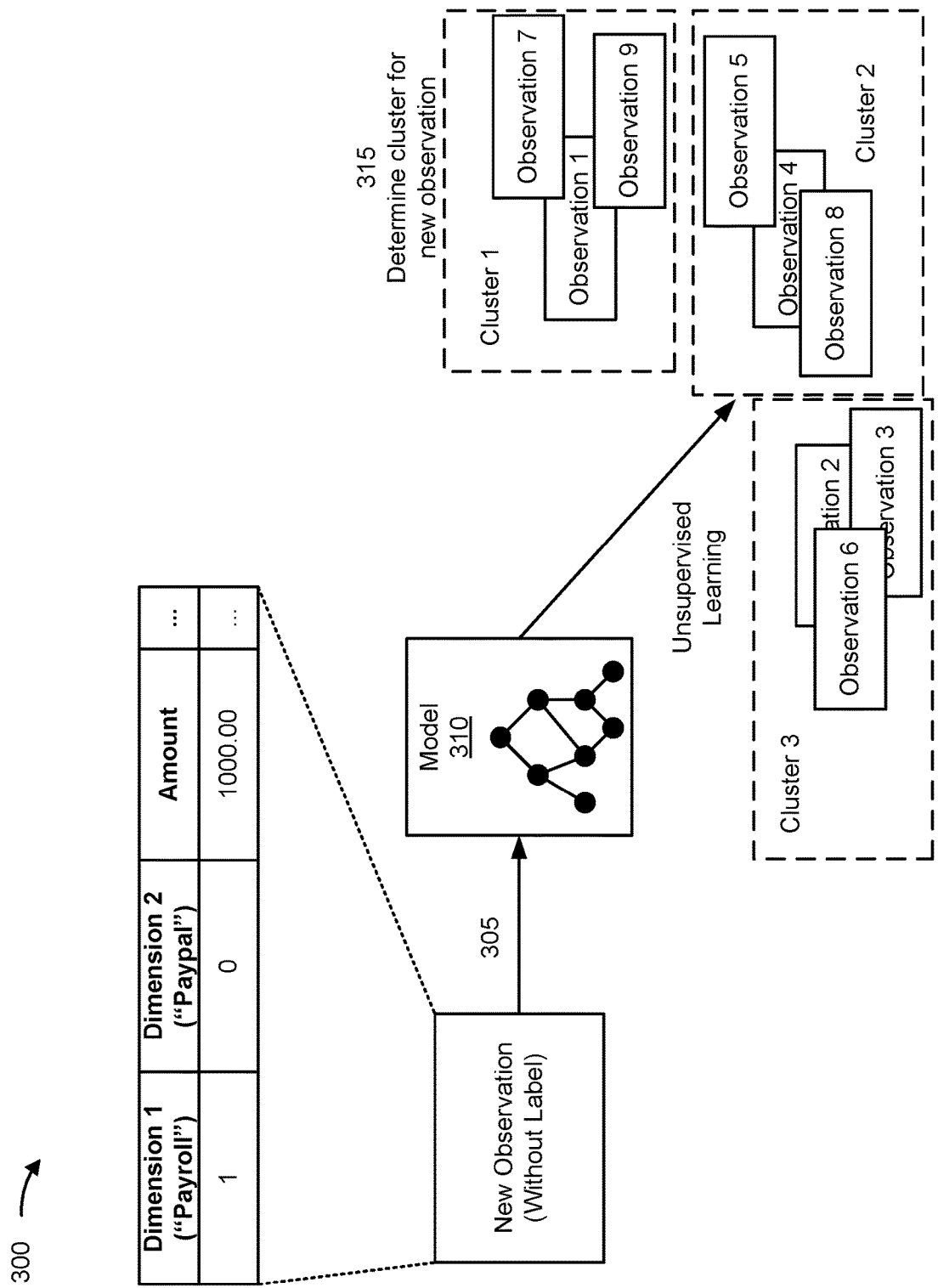
FIG. 3 is a diagram illustrating an example of applying a clustering model in connection with parsing event data for clustering and classification, in accordance with some embodiments of the present disclosure.

FIG. 3 is a diagram illustrating an example 300 of applying a clustering model in connection with parsing event data for clustering and classification. The clustering model described herein may be implemented at a machine learning system. The machine learning system may include or may be included in a computing device, a server, a cloud computing environment, or the like, such as a classification system described in more detail below.

As shown in FIG. 3, the clustering model may operate on observations. The observations may include data gathered from a data source, as described elsewhere herein. In some implementations, the machine learning system may receive the observations (e.g., as input) from the classification system.

As further shown in FIG. 3, a feature set may be derived from the observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. As described herein, the machine learning system may determine variables based on the observations such that a vector space associated with the clustering model is infinite-dimensional. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Accordingly, as shown in FIG. 3, each word of string descriptions associated with the observations may correspond to a different dimension in the vector space.

In some implementations, the clustering model may be trained on a set of observations that do not include a target variable. This may be referred to as an unsupervised learning model, an automated data analysis model, or an automated signal extraction model. In this case, the clustering model may learn patterns from the set of observations without labeling or supervision, and may provide output that indicates such patterns, such as by using clustering and/or association to identify related groups of items within the set of observations.

FIG. 3 further shows applying the clustering model 310 to a new observation. As shown by reference number 305, the machine learning system may receive a new observation (or a set of new observations), and may input the new observation to the clustering model 310. As shown, the new observation may include a first feature of 1 (associated with a dimension for the word "payroll"), a second feature of 0 (associated with a dimension for the word "Paypal"), a third feature of 1000.00 (corresponding to an amount associated with the new observation), and so on, as an example. The machine learning system may apply the clustering model 310 to the new observation to generate an output (e.g., a result). The output may include information that identifies a cluster to which the new observation belongs and/or information that indicates a degree of similarity between the new observation and one or more prior observations (e.g., which may have previously been new observations input to the clustering model and/or observations used to train the clustering model).

In some implementations, the clustering model 310 may classify (e.g., cluster) the new observation in a cluster, as shown by reference number 315. The observations within a cluster may have a threshold degree of similarity. As an example, if the machine learning system classifies the new observation in a first cluster (e.g., a salary cluster), then the machine learning system may provide a first recommendation, such as including the observation in a payroll income classification. Additionally, or alternatively, the machine learning system may perform a first automated action and/or may cause a first automated action to be performed (e.g., by instructing another device to perform the automated action) based on classifying the new observation in the first cluster, such as classifying the new observation with other observations in the first cluster. As another example, if the machine learning system were to classify the new observation in a second cluster (e.g., a gig economy cluster), then the machine learning system may provide a second (e.g., different) recommendation (e.g., including the observation in a side business classification) and/or may perform or cause performance of a second (e.g., different) automated action, such as classifying the new observation with other observations in the second cluster.

In this way, the machine learning system may apply a rigorous and automated process to event clustering. The machine learning system enables recognition and/or identification of tens, hundreds, thousands, or millions of features and/or feature values for tens, hundreds, thousands, or millions of observations, thereby increasing accuracy and consistency and reducing delay associated with clustering events from structured data relative to requiring computing resources to be allocated for tens, hundreds, or thousands of operators to manually cluster event data using the features or feature values. Additionally, the machine learning system uses unsupervised learning in order to conserve power, processing resources, and delay, relative to using supervised learning to cluster events from structured data.

As indicated above, FIG. 3 is provided as an example. Other examples may differ from what is described in connection with FIG. 3.

Figure 4A:
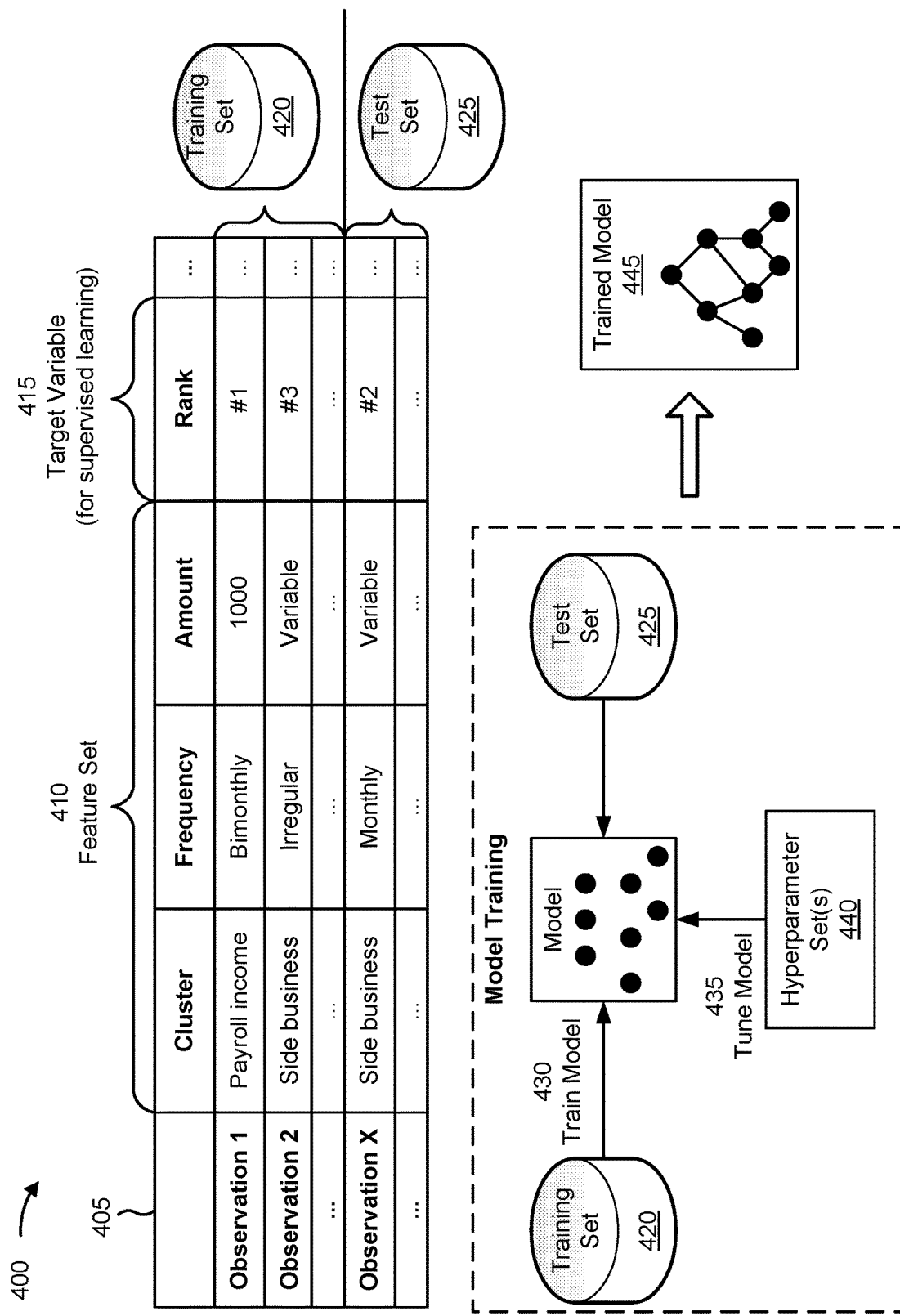
FIGS. 4A-4B are diagrams illustrating an example of training and using a machine learning model in connection with ranking event data classifications, in accordance with some embodiments of the present disclosure.
Figure 4B:
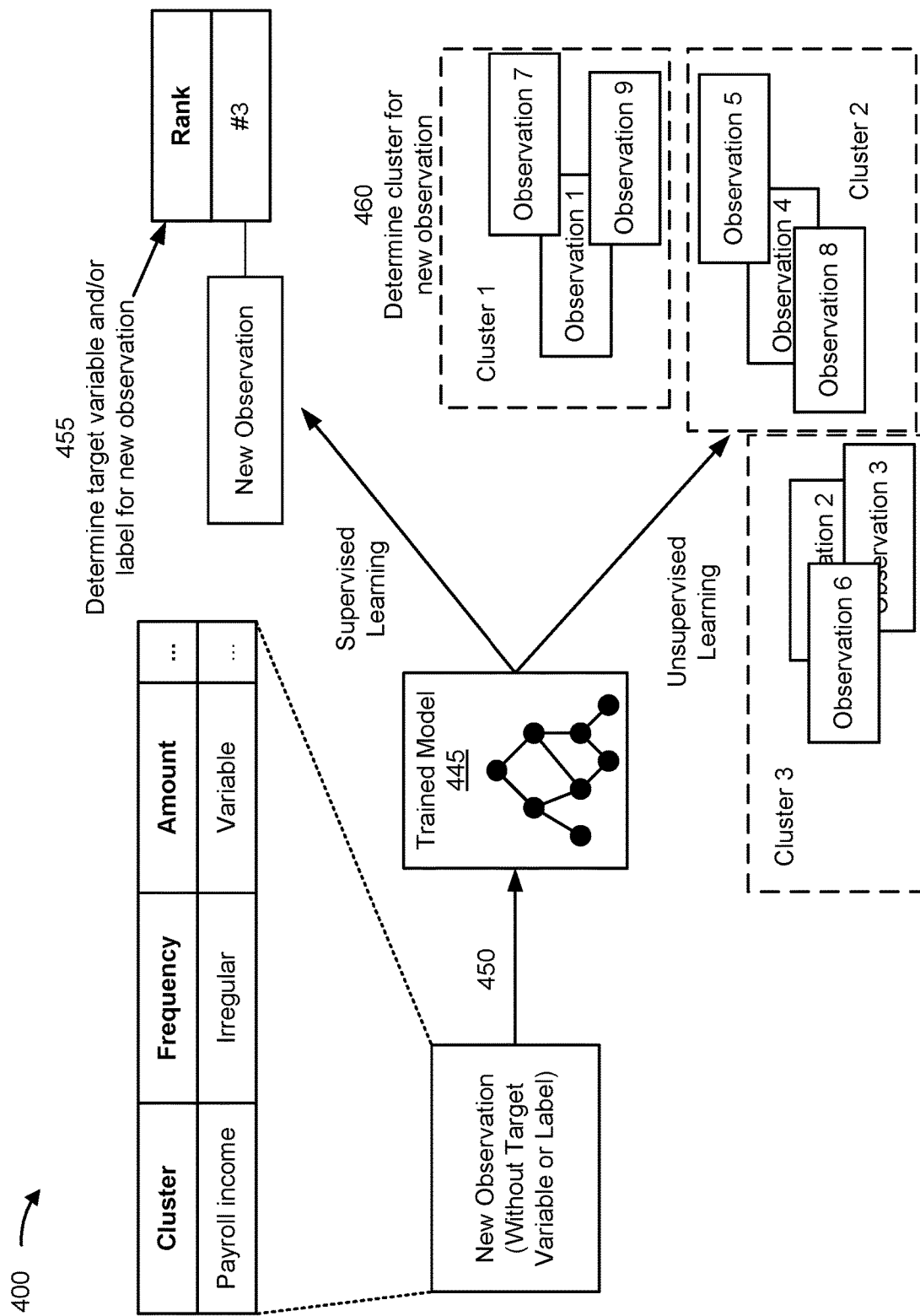

FIGS. 4A-4B are diagrams illustrating an example 400 of training and using a machine learning model in connection with ranking event data classifications. The machine learning model training described herein may be performed using a machine learning system. The machine learning system may include or may be included in a computing device, a server, a cloud computing environment, or the like, such as a classification system described in more detail below.

As shown by reference number 405, a machine learning model may be trained using a set of observations. The set of observations may be obtained and/or input from training data (e.g., historical data), such as data gathered during one or more processes described herein. For example, the set of observations may include data gathered from a data source, as described elsewhere herein. In some implementations, the machine learning system may receive the set of observations (e.g., as input) from the classification system.

As shown by reference number 410, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the classification system. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a cluster (e.g., a label associated with the cluster), a second feature of a frequency (e.g., estimated within a margin of error, as described herein), a third feature of an amount (e.g., an average, a median, or a mode, among other examples), and so on. As shown, for a first observation, the first feature may have a value of a payroll income cluster, the second feature may have a value of bimonthly, the third feature may have a value of 1000, and so on. These features and feature values are provided as examples, and may differ in other examples. For example, the feature set may include one or more of the following features: a standard deviation (e.g., associated with the amount) and/or one or more dimensions based on string descriptions (e.g., as described in connection with FIG. 3), among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 415, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 400, the target variable is a rank, which has a value of #1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 420 that includes a first subset of observations, of the set of observations, and a test set 425 that includes a second subset of observations of the set of observations. The training set 420 may be used to train (e.g., fit or tune) the machine learning model, while the test set 425 may be used to evaluate a machine learning model that is trained using the training set 420. For example, for supervised learning, the test set 425 may be used for initial model training using the first subset of observations, and the test set 425 may be used to test whether the trained model accurately predicts target variables in the second subset of observations. In some implementations, the machine learning system may partition the set of observations into the training set 420 and the test set 425 by including a first portion or a first percentage of the set of observations in the training set 420 (e.g., 75%, 80%, or 85%, among other examples) and including a second portion or a second percentage of the set of observations in the test set 425 (e.g., 25%, 20%, or 15%, among other examples). In some implementations, the machine learning system may randomly select observations to be included in the training set 420 and/or the test set 425.

As shown by reference number 430, the machine learning system may train a machine learning model using the training set 420. This training may include executing, by the machine learning system, a machine learning algorithm to determine a set of model parameters based on the training set 420. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 420). For example, for a regression algorithm, a model parameter may include a regression coefficient (e.g., a weight). For a decision tree algorithm, a model parameter may include a decision tree split location, as an example.

As shown by reference number 435, the machine learning system may use one or more hyperparameter sets 440 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 420. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 420. The machine learning system may tune each machine learning algorithm using one or more hyperparameter sets 440 (e.g., based on operator input that identifies hyperparameter sets 440 to be used and/or based on randomly generating hyperparameter values). The machine learning system may train a particular machine learning model using a specific machine learning algorithm and a corresponding hyperparameter set 440. In some implementations, the machine learning system may train multiple machine learning models to generate a set of model parameters for each machine learning model, where each machine learning model corresponds to a different combination of a machine learning algorithm and a hyperparameter set 440 for that machine learning algorithm.

In some implementations, the machine learning system may perform cross-validation when training a machine learning model. Cross validation can be used to obtain a reliable estimate of machine learning model performance using only the training set 420, and without using the test set 425, such as by splitting the training set 420 into a number of groups (e.g., based on operator input that identifies the number of groups and/or based on randomly selecting a number of groups) and using those groups to estimate model performance. For example, using k-fold cross-validation, observations in the training set 420 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 440 associated with a particular machine learning algorithm. The machine learning system may compare the overall cross-validation scores for different hyperparameter sets 440 associated with the particular machine learning algorithm, and may select the hyperparameter set 440 with the best (e.g., highest accuracy, lowest error, or closest to a desired threshold) overall cross-validation score for training the machine learning model. The machine learning system may then train the machine learning model using the selected hyperparameter set 440, without cross-validation (e.g., using all of data in the training set 420 without any hold-out groups), to generate a single machine learning model for a particular machine learning algorithm. The machine learning system may then test this machine learning model using the test set 425 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 445 to be used to analyze new observations, as described below in connection with FIG. 4B.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 420 (e.g., without cross-validation), and may test each machine learning model using the test set 425 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 445.

FIG. 4B is a diagram illustrating applying the trained machine learning model 445 to a new observation. The new observation may be input to the machine learning system that stores the trained machine learning model 445.

As shown by reference number 450, the machine learning system may receive a new observation (or a set of new observations), and may input the new observation to the machine learning model 445. As shown, the new observation may include a first feature of a "payroll income" cluster, a second feature of an irregular frequency, a third feature of a variable amount, and so on, as an example. The machine learning system may apply the trained machine learning model 445 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 445 may predict a value of #3 for the target variable of rank for the new observation, as shown by reference number 455 (and thus move other observations down in rank accordingly). Based on this prediction (e.g., based on the value having a particular label or classification or based on the value satisfying or failing to satisfy a threshold), the machine learning system may provide a recommendation and/or output for determination of a recommendation, such as displaying the new observation higher in a GUI than other observations lower in rank. Additionally, or alternatively, the machine learning system may perform an automated action and/or may cause an automated action to be performed (e.g., by instructing another device to perform the automated action), such as generating a GUI with the new observation closer to a top of the GUI than other observations that are lower in rank. In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 445 may classify (e.g., cluster) the new observation in a cluster, as shown by reference number 460. The observations within a cluster may have a threshold degree of similarity. As an example, if the machine learning system classifies the new observation in a first cluster (e.g., highest-ranking observations), then the machine learning system may provide a first recommendation, such as displaying the new observation higher in a GUI than observations in other clusters. Additionally, or alternatively, the machine learning system may perform a first automated action and/or may cause a first automated action to be performed (e.g., by instructing another device to perform the automated action) based on classifying the new observation in the first cluster, such as generating a GUI with observations in the first cluster closer to a top of the GUI than observations in the second cluster. As another example, if the machine learning system were to classify the new observation in a second cluster (e.g., lowest-ranking observations), then the machine learning system may provide a second (e.g., different) recommendation (e.g., displaying the new observation lower in a GUI than observations in other clusters) and/or may perform or cause performance of a second (e.g., different) automated action, such as generating a GUI with observations in the second cluster closer to a bottom of the GUI than observations in the first cluster.

In this way, the machine learning system may apply a rigorous and automated process to ranking classifications (e.g., labeled clusters of events). The machine learning system enables recognition and/or identification of tens, hundreds, thousands, or millions of features and/or feature values for tens, hundreds, thousands, or millions of observations, thereby increasing accuracy and consistency and reducing delay associated with ranking classifications relative to requiring computing resources to be allocated for tens, hundreds, or thousands of operators to manually rank classifications using the features or feature values. Moreover, by increasing accurate ranking of the classifications, the machine learning system reduces an amount of time for a user to confirm the classifications, which results in conserved power and processing resources because a user device shows a GUI with the ranked classifications for a shorter amount of time and because the user interacts with the GUI (e.g., scrolling up and down) for a shorter amount of time.

As indicated above, FIGS. 4A-4B are provided as an example. Other examples may differ from what is described in connection with FIGS. 4A-4B. For example, the machine learning model may be trained using a different process than what is described in connection with FIG. 4A. Additionally, or alternatively, the machine learning model may employ a different machine learning algorithm than what is described in connection with FIGS. 4A-4B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 5:
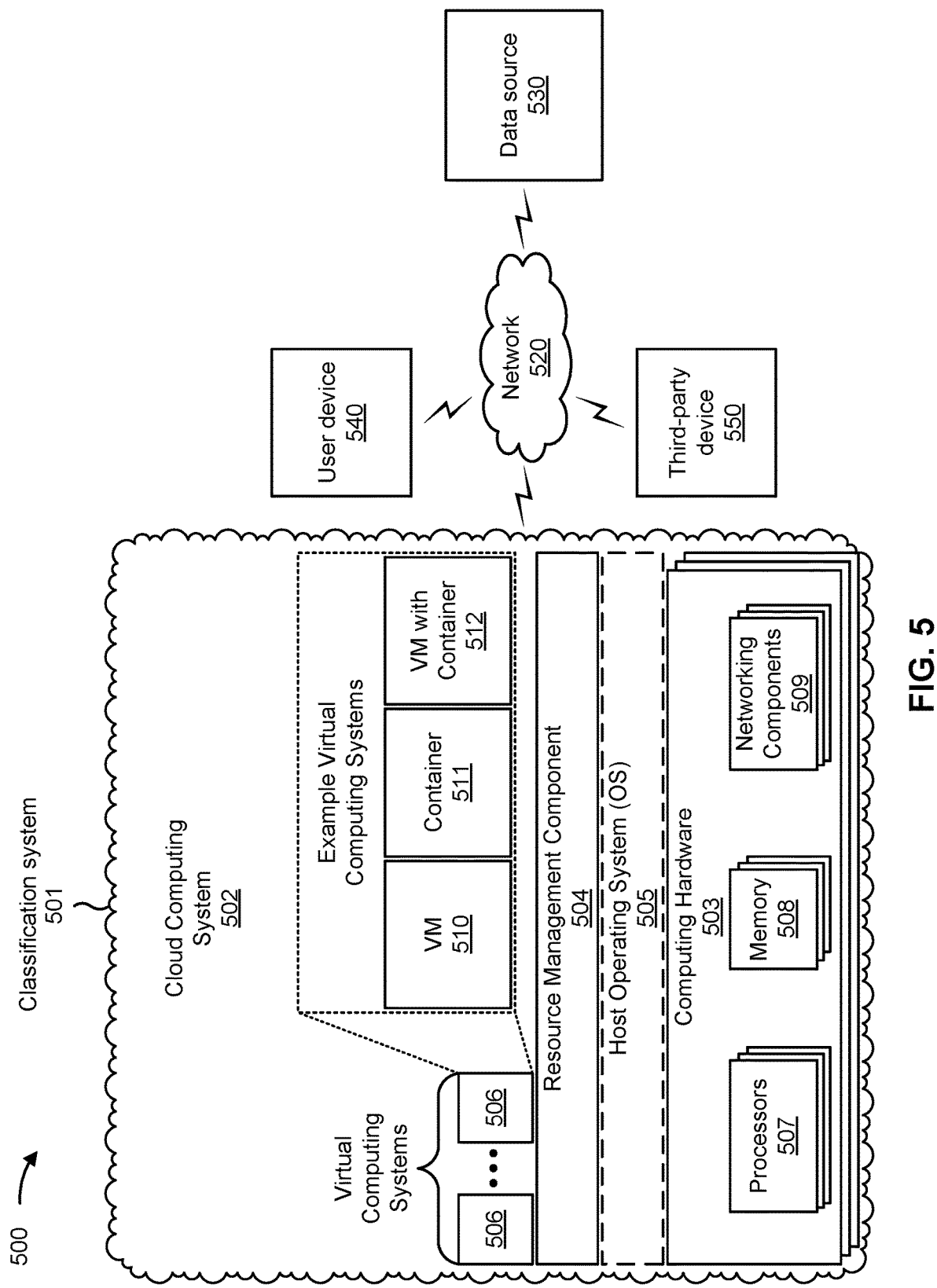
FIG. 5 is a diagram of an example environment in which systems and/or methods described herein may be implemented, in accordance with some embodiments of the present disclosure.

FIG. 5 is a diagram of an example environment 500 in which systems and/or methods described herein may be implemented. As shown in FIG. 5, environment 500 may include a classification system 501, which may include one or more elements of and/or may execute within a cloud computing system 502. The cloud computing system 502 may include one or more elements 503-512, as described in more detail below. As further shown in FIG. 5, environment 500 may include a network 520, a data source 530, a user device 540, and/or a third-party device 550. Devices and/or elements of environment 500 may interconnect via wired connections and/or wireless connections.

The cloud computing system 502 includes computing hardware 503, a resource management component 504, a host operating system (OS) 505, and/or one or more virtual computing systems 506. The cloud computing system 502 may execute on, for example, an Amazon Web Services platform, a Microsoft Azure platform, or a Snowflake platform. The resource management component 504 may perform virtualization (e.g., abstraction) of computing hardware 503 to create the one or more virtual computing systems 506. Using virtualization, the resource management component 504 enables a single computing device (e.g., a computer or a server) to operate like multiple computing devices, such as by creating multiple isolated virtual computing systems 506 from computing hardware 503 of the single computing device. In this way, computing hardware 503 can operate more efficiently, with lower power consumption, higher reliability, higher availability, higher utilization, greater flexibility, and lower cost than using separate computing devices.

Computing hardware 503 includes hardware and corresponding resources from one or more computing devices. For example, computing hardware 503 may include hardware from a single computing device (e.g., a single server) or from multiple computing devices (e.g., multiple servers), such as multiple computing devices in one or more data centers. As shown, computing hardware 503 may include one or more processors 507, one or more memories 508, and/or one or more networking components 509. Examples of a processor, a memory, and a networking component (e.g., a communication component) are described elsewhere herein.

The resource management component 504 includes a virtualization application (e.g., executing on hardware, such as computing hardware 503) capable of virtualizing computing hardware 503 to start, stop, and/or manage one or more virtual computing systems 506. For example, the resource management component 504 may include a hypervisor (e.g., a bare-metal or Type 1 hypervisor, a hosted or Type 2 hypervisor, or another type of hypervisor) or a virtual machine monitor, such as when the virtual computing systems 506 are virtual machines 510. Additionally, or alternatively, the resource management component 504 may include a container manager, such as when the virtual computing systems 506 are containers 511. In some implementations, the resource management component 504 executes within and/or in coordination with a host operating system 505.

A virtual computing system 506 includes a virtual environment that enables cloud-based execution of operations and/or processes described herein using computing hardware 503. As shown, a virtual computing system 506 may include a virtual machine 510, a container 511, or a hybrid environment 512 that includes a virtual machine and a container, among other examples. A virtual computing system 506 may execute one or more applications using a file system that includes binary files, software libraries, and/or other resources required to execute applications on a guest operating system (e.g., within the virtual computing system 506) or the host operating system 505.

Although the classification system 501 may include one or more elements 503-512 of the cloud computing system 502, may execute within the cloud computing system 502, and/or may be hosted within the cloud computing system 502, in some implementations, the classification system 501 may not be cloud-based (e.g., may be implemented outside of a cloud computing system) or may be partially cloud-based. For example, the classification system 501 may include one or more devices that are not part of the cloud computing system 502, such as device 600 of FIG. 6, which may include a standalone server or another type of computing device. The classification system 501 may perform one or more operations and/or processes described in more detail elsewhere herein.

Network 520 includes one or more wired and/or wireless networks. For example, network 520 may include a cellular network, a public land mobile network (PLMN), a local area network (LAN), a wide area network (WAN), a private network, the Internet, and/or a combination of these or other types of networks. The network 520 enables communication among the devices of environment 500.

The data source 530 includes one or more devices capable of receiving, generating, storing, processing, and/or providing information associated with structured data to be classified, as described elsewhere herein. The data source 530 may include a communication device and/or a computing device. For example, the data source 530 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 530 may communicate with one or more other devices of environment 500, as described elsewhere herein.

The user device 540 includes one or more devices capable of receiving, generating, storing, processing, and/or providing information associated with structured data to be classified, as described elsewhere herein. The user device 540 may include a communication device and/or a computing device. For example, the user device 540 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The third-party device 550 includes one or more devices capable of receiving, generating, storing, processing, providing, and/or routing information associated with classified structured data, as described elsewhere herein. The third-party device 550 may include a communication device and/or a computing device. For example, the third-party device 550 may include a server, such as an application server, a client server, a web server, a database server, a host server, a proxy server, a virtual server (e.g., executing on computing hardware), or a server in a cloud computing system. In some implementations, the third-party device 550 includes computing hardware used in a cloud computing environment.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
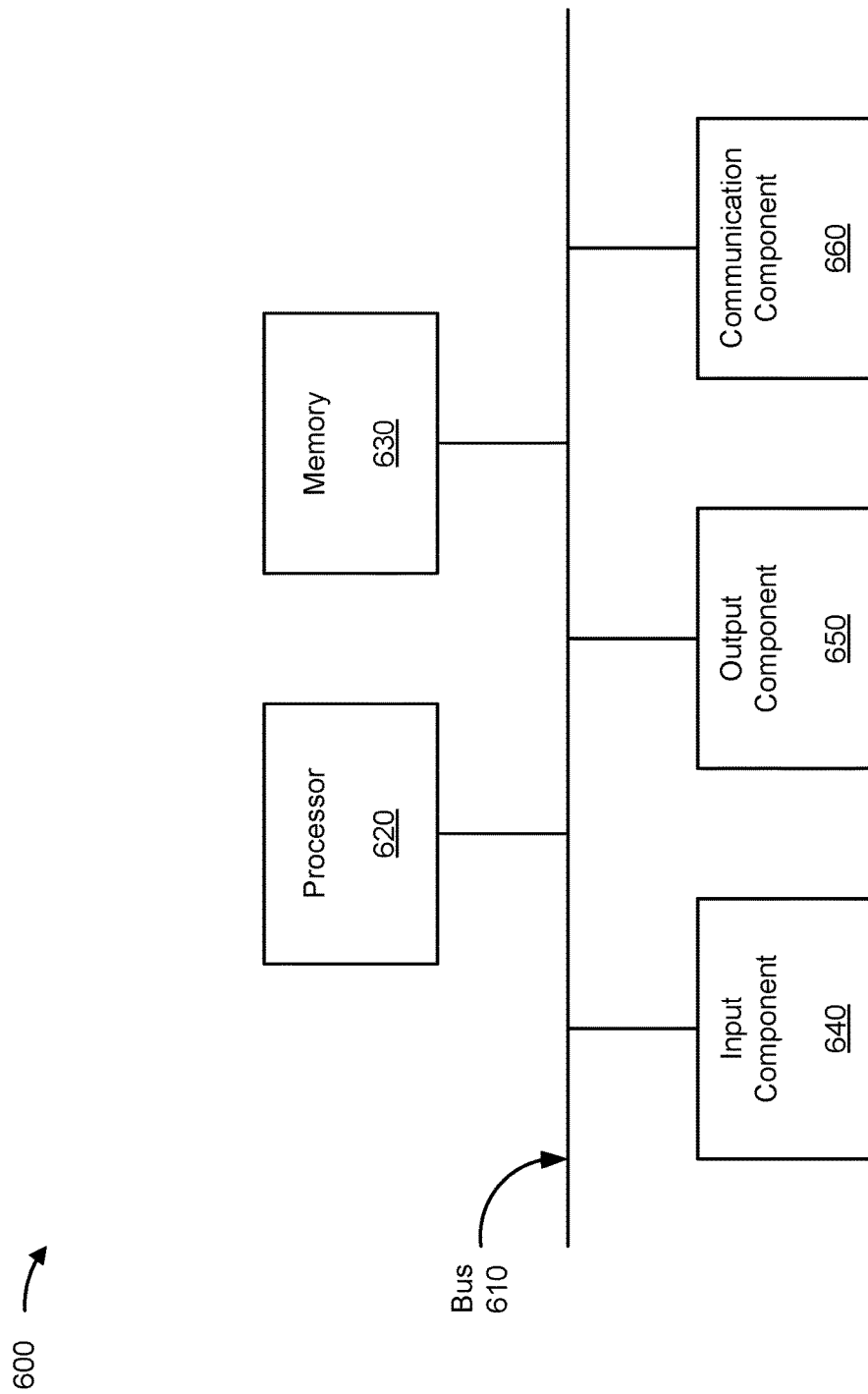
FIG. 6 is a diagram of example components of one or more devices of FIG. 5, in accordance with some embodiments of the present disclosure.

FIG. 6 is a diagram of example components of a device 600 associated with parsing event data for clustering and classification. Device 600 may correspond to data source 530, user device 540, and/or third-party device 550. In some implementations, the data source 530, the user device 540, and/or the third-party device 550 may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry is used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
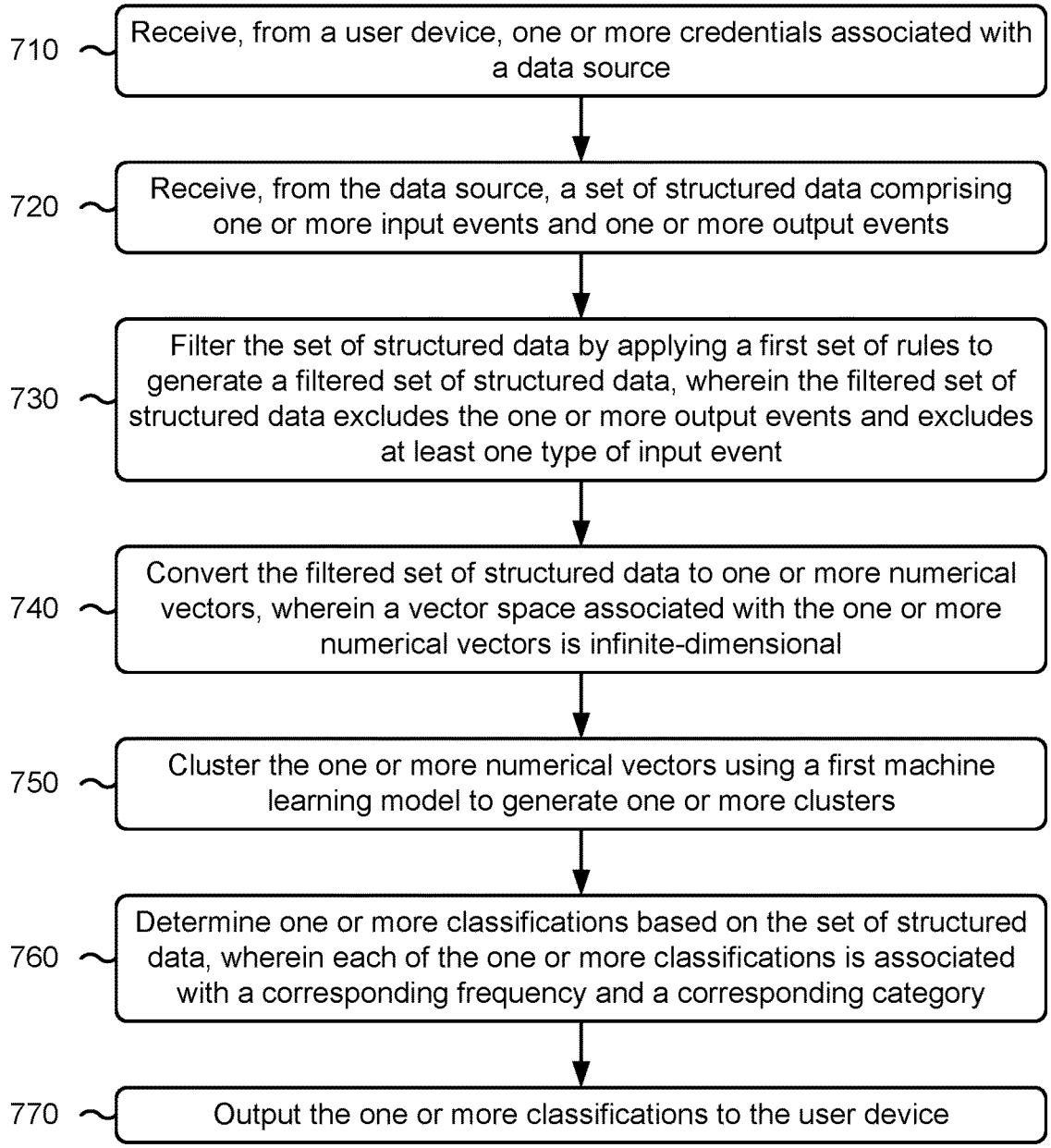
FIG. 7 is a flowchart of an example process associated with parsing event data for clustering and classification, in accordance with some embodiments of the present disclosure.

FIG. 7 is a flowchart of an example process 700 associated with parsing event data for clustering and classification. In some implementations, one or more process blocks of FIG. 7 may be performed by the classification system 501. In some implementations, one or more process blocks of FIG. 7 may be performed by another device or a group of devices separate from or including the classification system 501, such as the data source 530, the user device 540, and/or the third-party device 550. Additionally, or alternatively, one or more process blocks of FIG. 7 may be performed by one or more components of the device 600, such as processor 620, memory 630, input component 640, output component 650, and/or communication component 660.

As shown in FIG. 7, process 700 may include receiving, from a user device, one or more credentials associated with a data source (block 710). For example, the classification system 501 (e.g., using processor 620, memory 630, input component 640, and/or communication component 660) may receive, from a user device (e.g., user device 540), one or more credentials associated with a data source (e.g., data source 530), as described above in connection with reference number 110 of FIG. 1A.

As further shown in FIG. 7, process 700 may include receiving, from the data source, a set of structured data comprising one or more input events and one or more output events (block 720). For example, the classification system 501 (e.g., using processor 620, memory 630, input component 640, and/or communication component 660) may receive, from the data source (e.g., data source 530), a set of structured data comprising one or more input events and one or more output events, as described above in connection with reference number 140 of FIG. 1C.

As further shown in FIG. 7, process 700 may include filtering the set of structured data by applying a first set of rules to generate a filtered set of structured data, wherein the filtered set of structured data excludes the one or more output events and excludes at least one type of input event (block 730). For example, the classification system 501 (e.g., using processor 620 and/or memory 630) may filter the set of structured data by applying a first set of rules to generate a filtered set of structured data, such that the filtered set of structured data excludes the one or more output events and excludes at least one type of input event, as described above in connection with reference number 145 of FIG. 1C.

As further shown in FIG. 7, process 700 may include converting the filtered set of structured data to one or more numerical vectors, wherein a vector space associated with the one or more numerical vectors is infinite-dimensional (block 740). For example, the classification system 501 (e.g., using processor 620 and/or memory 630) may convert the filtered set of structured data to one or more numerical vectors, a vector space associated with the one or more numerical vectors being infinite-dimensional, as described above in connection with reference number 150 of FIG. 1D.

As further shown in FIG. 7, process 700 may include clustering the one or more numerical vectors using a first machine learning model to generate one or more clusters (block 750). For example, the classification system 501 (e.g., using processor 620 and/or memory 630) may cluster the one or more numerical vectors using a first machine learning model to generate one or more clusters, as described above in connection with reference number 155 of FIG. 1E.

As further shown in FIG. 7, process 700 may include determining one or more classifications based on the set of structured data, wherein each of the one or more classifications is associated with a corresponding frequency and a corresponding category (block 760). For example, the classification system 501 (e.g., using processor 620 and/or memory 630) may determine one or more classifications based on the set of structured data, with each of the one or more classifications being associated with a corresponding frequency and a corresponding category, as described above in connection with reference number 160 of FIG. 1F.

As further shown in FIG. 7, process 700 may include outputting the one or more classifications to the user device (block 770). For example, the classification system 501 (e.g., using processor 620, memory 630, and/or output component 650) may output the one or more classifications to the user device (e.g., user device 540), as described above in connection with reference number 170 of FIG. 1G.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1H.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for parsing event data for clustering and classification, the system comprising:
   one or more memories; and
   one or more processors, communicatively coupled to the one or more memories, configured to:
      receive, from a data source over a computer network, a set of structured data comprising one or more input events and one or more output events;
      filter the set of structured data by applying a first set of rules to generate a filtered set of structured data, wherein the filtered set of structured data excludes the one or more output events and excludes at least one type of input event;
      convert the filtered set of structured data to a plurality of numerical vectors, wherein a vector space associated with the plurality of numerical vectors is infinite-dimensional, wherein to convert the filtered set of structured data to the plurality of numerical vectors includes to:
         calculate, for each numerical vector, one or more values corresponding to one or more dimensions, wherein each dimension is associated with a different portion of a string for an event in the filtered set of structured data;
      cluster the plurality of numerical vectors using a first machine learning model to generate a plurality of clusters;
      determine a plurality of classifications based on the set of structured data by applying a second set of rules to the plurality of clusters, wherein each of the plurality of classifications is associated with a corresponding frequency and a corresponding category;
      rank the plurality of classifications using a second machine learning model; and
      output the plurality of classifications, as ranked, to a graphical user interface (GUI) of a user device.

2. The system of claim 1, wherein the one or more processors are further configured to:
   receive, from the user device, a request for classification; and
   receive, from the user device, one or more credentials associated with the data source, wherein the set of structured data is received using the one or more credentials.

3. The system of claim 1, wherein the first set of rules includes one or more string match rules, one or more mathematical rules, or a combination thereof.

4. The system of claim 1, wherein the first machine learning model comprises an unsupervised model.

5. The system of claim 1, wherein the second set of rules includes one or more string match rules, one or more frequency rules, or a combination thereof.

6. The system of claim 1, wherein the one or more processors are further configured to:
   receive, from the user device, a confirmation of one or more classifications of the plurality of classifications; and
   generate a finalized data structure based on the one or more classifications.

7. A method, implemented on a computer, of parsing event data for clustering and classification, comprising:
   receiving, from a user device over a computer network, one or more credentials associated with a data source;
   receiving, from the data source over the computer network, a set of structured data comprising one or more input events and one or more output events;
   filtering the set of structured data by applying a first set of rules to generate a filtered set of structured data, wherein the filtered set of structured data excludes the one or more output events and excludes at least one type of input event;
   converting the filtered set of structured data to one or more numerical vectors, wherein a vector space associated with the one or more numerical vectors is infinite-dimensional, wherein said converting the filtered set of structured data to the one or more numerical vectors includes:
      calculating, for each numerical vector, one or more values corresponding to one or more dimensions, wherein each dimension is associated with a different portion of a string for an event in the filtered set of structured data;

clustering the one or more numerical vectors using a first machine learning model to generate one or more clusters;

determining one or more classifications based on the set of structured data, wherein each of the one or more classifications is associated with a corresponding frequency and a corresponding category; and outputting the one or more classifications to a graphical user interface (GUI) of the user device.

8. The method of claim 7, wherein the one or more credentials comprise a username and a password.

9. The method of claim 7, further comprising:

receiving, from the data source, a request for two-factor authorization;

receiving, from the user device, a response to the request; and forwarding the response to the data source, wherein the set of structured data is received based on the response.

10. The method of claim 7, wherein determining the one or more classifications based on the set of structured data comprises:

applying a second machine learning model to the one or more clusters, wherein the second machine learning model is trained using anonymized data associated with other users.

11. The method of claim 7, wherein the one or more classifications are output in descending order according to quantities associated with the one or more classifications.

12. The method of claim 7, wherein outputting the one or more classifications to the user device comprises:

outputting the graphical user interface (GUI), wherein each of the one or more classifications is indicated adjacent to a corresponding input element.

13. The method of claim 12, further comprising:

receiving, from the user device and using the one or more corresponding input elements, a confirmation of at least one classification of the one or more classifications; and generating a finalized data structure based on the at least one classification.

14. A non-transitory computer-readable medium storing a set of instructions for parsing transactional data for clustering and classification, the set of instructions comprising:

one or more instructions that, when executed by one or more processors of a device, cause the device to:

receive, from a first data source over a computer network, a first set of transactional data comprising one or more first input transactions and one or more first output transactions;

filter the first set of transactional data by applying a first set of rules to generate a first filtered set of transactional data, wherein the first filtered set of transactional data excludes the one or more first output transactions and excludes at least one type of input transaction;

convert the first filtered set of transactional data to one or more first numerical vectors, wherein a vector space associated with the one or more first numerical vectors is infinite, wherein to convert the filtered set of transactional data to the one or more first numerical vectors includes to:

calculate, for each numerical vector, one or more values corresponding to one or more dimensions, wherein each dimension is associated with a different portion of a string for an event in the filtered set of transactional data;

cluster the one or more first numerical vectors using a machine learning model to generate one or more first clusters;

determine one or more first transaction classifications based on the first set of structured data by applying a second set of rules to the one or more first clusters, where each of the one or more first transaction classifications is associated with a corresponding transaction frequency and a corresponding transaction category; and output the one or more first transaction classifications to a graphical user interface (GUI) of a user device.

15. The non-transitory computer-readable medium of claim 14, wherein the one or more instructions, when executed by the one or more processors, further cause the device to:

receive, from a second data source, a second set of transactional data comprising one or more second input transactions and one or more second output transactions;

filter the second set of transactional data by applying the first set of rules to generate a second filtered set of transactional data, wherein the second filtered set of transactional data excludes the one or more second output transactions and excludes the at least one type of input transaction;

convert the second filtered set of transactional data to one or more second numerical vectors, wherein a vector space associated with the one or more second numerical vectors is infinite;

cluster the one or more second numerical vectors using the machine learning model to generate one or more second clusters;

determine one or more second transaction classifications based on the second set of structured data by applying the second set of rules to the one or more second clusters, where each of the one or more second transaction classifications is associated with a corresponding transaction frequency and a corresponding transaction category; and output the one or more second transaction classifications to a user device.

16. The non-transitory computer-readable medium of claim 15, wherein the one or more instructions, when executed by the one or more processors, further cause the device to:

receive, from the user device, a confirmation of at least one first transaction classification of the one or more first transaction classifications;

receive, from the user device, a confirmation of at least one second transaction classification of the one or more second transaction classifications; and generate a finalized data structure based on the at least one first transaction classification and the at least one second transaction classification.

17. The non-transitory computer-readable medium of claim 16, wherein the one or more instructions, when executed by the one or more processors, further cause the device to:

output the graphical user interface (GUI) indicating at least one first total amount associated with the at least one first transaction classification and at least one second total amount associated with the at least one second transaction classification.

18. The non-transitory computer-readable medium of claim 14, wherein the one or more corresponding transaction frequencies include an irregular frequency and at least one regular frequency.

19. The non-transitory computer-readable medium of claim 14, wherein the one or more corresponding transaction categories include a payroll income category and a side business category.

20. The non-transitory computer-readable medium of claim 14, wherein the second set of rules includes one or more string match rules, one or more frequency rules, or a combination thereof.

\* \* \* \* \*